US012807829B2

(12) United States Patent
Nakamura et al.

(10) Patent No.: US 12,807,829 B2
(45) Date of Patent: Nov. 24, 2026

(54) PIGMENT PRINTING INK JET INK COMPOSITION AND INK JET RECORDING METHOD

(71) Applicant: SEIKO EPSON CORPORATION, Tokyo (JP)

(72) Inventors: Tasuku Nakamura, Matsumoto (JP); Kenta Uchida, Matsumoto (JP); Akiko Yamada, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 131 days.

(21) Appl. No.: 18/505,580

(22) Filed: Nov. 9, 2023

(65) Prior Publication Data

US 2024/0158655 A1 May 16, 2024

(30) Foreign Application Priority Data

Nov. 10, 2022 (JP) ................................. 2022-180118

(51) Int. Cl.
*C09D 11/324* (2014.01)
*C09D 11/54* (2014.01)

(52) U.S. Cl.
CPC ............ *C09D 11/324* (2013.01); *C09D 11/54* (2013.01)

(58) Field of Classification Search
CPC ...................................................... C09D 11/40
See application file for complete search history.

(56) References Cited

U.S. PATENT DOCUMENTS

| | | | | |
|---|---|---|---|---|
| 2012/0127234 | A1 | 5/2012 | Yoshizawa et al. | |
| 2014/0028765 | A1* | 1/2014 | Hakiri | C09D 11/324 347/100 |
| 2019/0249021 | A1* | 8/2019 | Chidate | B41J 2/2107 |
| 2019/0249023 | A1* | 8/2019 | Deardurff | C09D 11/38 |
| 2020/0362184 | A1* | 11/2020 | Mizutaki | C08K 3/04 |
| 2021/0009836 | A1* | 1/2021 | Butler | B41J 2/1714 |
| 2021/0062027 | A1 | 3/2021 | Watanabe et al. | |
| 2021/0222019 | A1* | 7/2021 | Mizutaki | C09D 11/033 |
| 2021/0246324 | A1* | 8/2021 | Kumamoto | C09D 11/40 |

FOREIGN PATENT DOCUMENTS

| | | | |
|---|---|---|---|
| JP | 2011-046924 | A | 3/2011 |
| JP | 2018-053170 | A | 4/2018 |
| JP | 2021-031603 | A | 3/2021 |

* cited by examiner

*Primary Examiner* — Shelby L Fidler
(74) *Attorney, Agent, or Firm* — Harness, Dickey & Pierce, P.L.C.

(57) ABSTRACT

A pigment printing ink jet ink composition according to one embodiment of the present disclosure includes a self-dispersible black pigment having a specific surface area of 50 $m^2/g$ or more calculated from a measurement by a pulse NMR at 30° C., a metal alkali, a water-soluble organic solvent, and water, and in the ink composition described above, a content of the self-dispersible black pigment with respect to a content of the metal alkali is 13 to 40 in terms of a composition ratio, the water-soluble organic solvent includes a compound having an SP value of 11 or more, and the water-soluble organic solvent includes no compound having an SP value of less than 11 at a content of more than 0.3 percent by mass with respect to a total mass of the ink composition.

8 Claims, 1 Drawing Sheet

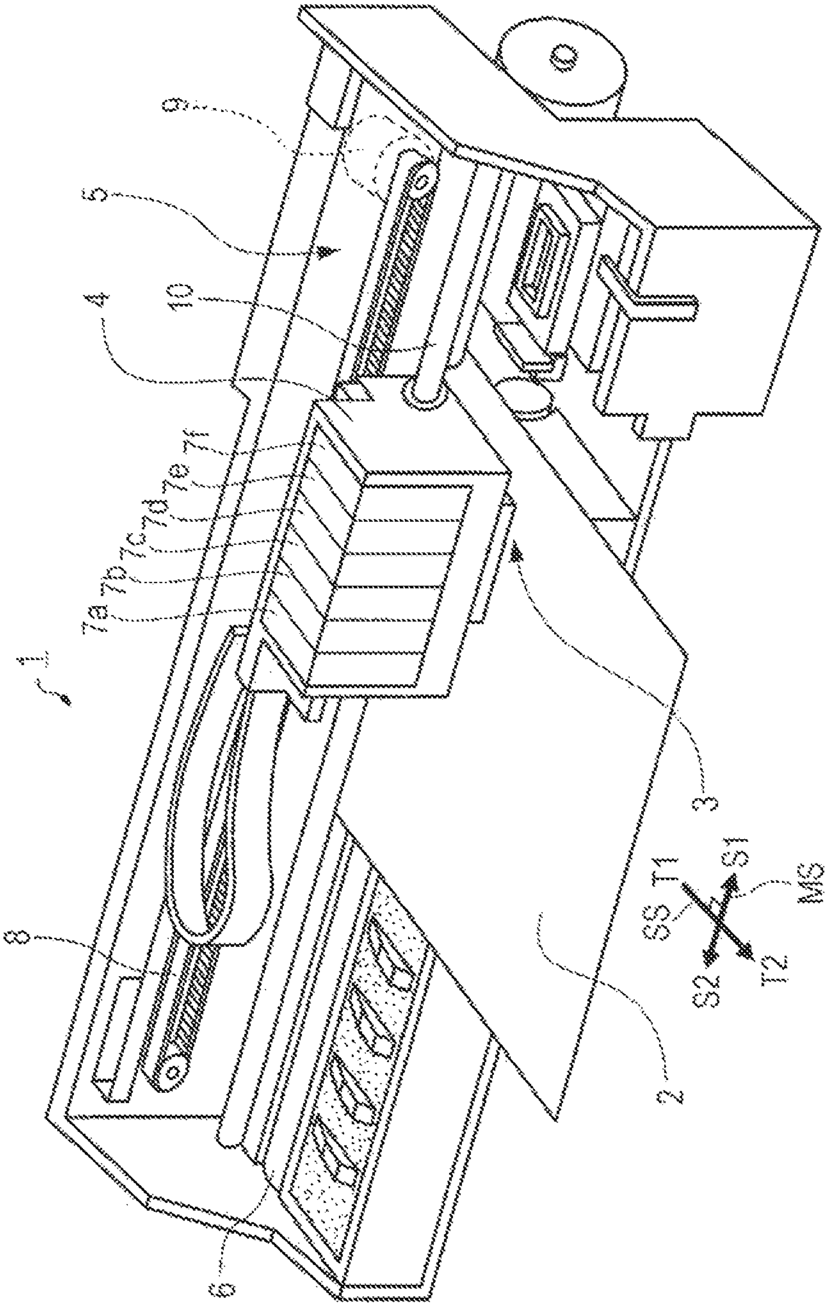
1
2
3
4
5
6
7a
7b
7c
7d
7e
7f
8
9
10
SS
T1
S1
MS
S2
T2

PIGMENT PRINTING INK JET INK COMPOSITION AND INK JET RECORDING METHOD

The present application is based on, and claims priority from JP Application Serial Number 2022-180118, filed Nov. 10, 2022, the disclosure of which is hereby incorporated by reference herein in its entirety.

BACKGROUND

1. Technical Field

The present disclosure relates to a pigment printing ink jet ink composition and an ink jet recording method.

2. Related Art

Printing to record an image on a cloth, such as a woven cloth, a knitted cloth, or a non-woven cloth, has been known. In recent years, for example, since ink for printing can be efficiently used, an ink jet recording method has been used also in the printing. In addition, since a color development property of an image is preferable, a pigment printing ink jet ink composition containing a pigment as a colorant is used in an ink jet recording method.

For example, JP-A-2011-46924 has disclosed a pigment printing ink jet ink composition containing a self-dispersible pigment.

However, in the pigment printing ink jet ink composition, in particular, a black color density (color development property) has not yet been satisfied. In addition, when the color development property (black density) is improved, a new problem, that is, a decrease in ejection reliability, may occur in some cases. Hence, a pigment printing ink jet ink composition excellent in both color development property (black density) and ejection reliability has been required.

SUMMARY

According to an aspect of the present disclosure, there is provided a pigment printing ink jet ink composition comprising: a self-dispersible black pigment having a specific surface area of 50 $m^2/g$ or more calculated from a measurement by a pulse NMR at 30° C.; a metal alkali; a water-soluble organic solvent; and water. In the pigment printing ink jet ink composition described above, a content of the self-dispersible black pigment with respect to a content of the metal alkali is 13 to 40 in terms of a composition ratio, the water-soluble organic solvent includes a compound having an SP value of 11 or more, and the water-soluble organic solvent includes no compound having an SP value of less than 11 at a content of more than 0.3 percent by mass with respect to a total mass of the ink composition.

According to another aspect of the present disclosure, there is provided an ink jet recording method comprising: an ink adhesion step of ejecting the pigment printing ink jet ink composition of the above aspect from an ink jet head so as to be adhered to a cloth; and a treatment liquid adhesion step of ejecting a treatment liquid containing a cationic compound from the ink jet head so as to be adhered to the cloth. In the ink jet recording method described above, the ink adhesion step and the treatment liquid adhesion step are performed on the same scanning region of the cloth by the same main scanning.

BRIEF DESCRIPTION OF THE DRAWING

FIG. 1*s* a schematic perspective view of an ink jet printing apparatus applicable to a recording method according to this embodiment.

DESCRIPTION OF EMBODIMENTS

Hereinafter, embodiments of the present disclosure will be described. The following embodiments are examples to explain the present disclosure. The present disclosure is not at all limited to the following embodiments and includes various types of modified and/or changed embodiments to be performed without departing from the scope of the present disclosure. In addition, all the constituents to be described below are not always required to be essential constituents of the present disclosure.

1. Pigment Printing Ink Jet Ink Composition

A pigment printing ink jet ink composition according to one embodiment of the present disclosure contains a self-dispersible black pigment having a specific surface area of 50 $m^2/g$ or more calculated from a measurement by a pulse NMR at 30° C., a metal alkali, a water-soluble organic solvent, and water. In the pigment printing ink jet ink composition described above, a content of the self-dispersible black pigment with respect to a content of the metal alkali is 13 to 40 in terms of a composition ratio, the water-soluble organic solvent includes a compound having an SP value of 11 or more, and the water-soluble organic solvent includes no compound having an SP value of less than 11 at a content of more than 0.3 percent by mass with respect to a total mass of the ink composition.

In a pigment printing ink jet ink composition, in particular, the color development property (black density) has not yet been satisfied. Accordingly, when a self-dispersible black pigment (specific pigment having a large specific surface area) having a specific surface area of 50 $m^2/g$ or more calculated from a measurement by a pulse NMR at 30° C. is used, the color development property (black density) can be improved. The reason for this is believed to be that since the pigment has a large specific surface area, a reactivity thereof with a treatment liquid containing a component, such as a cationic compound, to aggregate the ink is improved. That is, since a pigment having a large specific surface area easily aggregates, easily adsorbs on a recording medium surface, and more easily stays thereon, the color development property (black density) is improved. On the other hand, when a specific pigment having a large specific surface area is used, a new problem estimated to be caused by the high reactivity occurs, that is, for example, since an ink jet head is liable to be clogged, the ejection reliability is decreased.

In the case described above, the present inventors discovered that even if a specific pigment having a large specific surface area is contained, when a metal alkali is contained in a specific amount range, a dispersion stability of the ink is improved, and the ejection reliability thereof is also improved. In addition, when the SP value of the water-soluble organic solvent is adjusted, the dispersion stability of a specific pigment having a large specific surface area can be more improved, and since a rapid increase in viscosity during drying can be suppressed, the ejection reliability can be improved. As described above, according to the pigment printing ink jet ink composition of this embodiment, excellent color development property (black density) and ejection reliability can be obtained.

Hereinafter, individual components contained in the pigment printing ink jet ink composition (hereinafter, also referred to as "ink composition" in some cases) according to this embodiment will be described.

1.1. Self-Dispersible Black Pigment

The pigment printing ink jet ink composition according to this embodiment contains a self-dispersible black pigment having a specific surface area of 50 $m^2/g$ or more calculated from a measurement by a pulse NMR at 30° C.

A "self-dispersible" pigment indicates a pigment which can be dispersed by itself without using a dispersant or the like. That is, because of hydrophilic groups present on a pigment surface, a "self-dispersible" pigment can be stably present in a medium without using a dispersant to disperse the pigment.

Although not particularly limited, the self-dispersible black pigment is preferably a pigment which is surface-modified in a manner such that at least one functional group selected from the group consisting of a carbonyl group, a carboxy group, an aldehyde group, a hydroxy group, a sulfone group, an ammonium group, and a salt of at least one of those mentioned above is directly or indirectly bonded to the surface of the pigment. In particular, since a black color can be printed at a high density, and the ejection reliability can be made more excellent, the self-dispersible black pigment is preferably a surface-modified carbon black. As the carbon black, for example, Color Black 5150, Color Black 5160, or Color Black S170 (trade name, manufactured by Degussa) may be mentioned. As the surface modification of the self-dispersible black pigment, for example, an oxidation treatment using a hypohalous acid or a hypohalite, an oxidation treatment using ozone, or an oxidation treatment using persulfuric acid or a persulfate is preferable.

As the self-dispersible black pigment, a preparation prepared by a known method or a commercial product may be used. As the commercial product, for example, "Microjet CW1" or "Microjet CW2" manufactured by Orient Chemical Industries Co., Ltd., or "CAB-O-JET 200" or "CAB-O-JET 300" manufactured by Cabot Corporation may be mentioned.

The self-dispersible black pigment has a specific surface area of 50 $m^2/g$ or more which is calculated from a measurement by a pulse NMR at 30° C. Since the color development property (black density) tends to be made more excellent, the specific surface area described above is preferably 60 $m^2/g$ or more, more preferably 70 $m^2/g$ or more, and further preferably 80 $m^2/g$ or more. In addition, since the ejection reliability tends to be made more excellent, the specific surface area described above is preferably 500 $m^2/g$ or less, more preferably 350 $m^2/g$ or less, even more preferably 200 $m^2/g$ or less, and further preferably 150 $m^2/g$ or less.

The specific surface area ($S_p$) of the self-dispersible black pigment calculated from a measurement by a pulse NMR is obtained by the following equation (2) using a volume density ($\Psi_p$) of the self-dispersible black pigment obtained from the following equation (1).

$$\Psi_p=(S_c/S_d)/[(1-S_c)/T_d] \quad \text{Equation (1)}$$

In the above equation, $S_c$ represents a pigment solid content concentration (percent by mass) of a measurement sample (dispersion liquid of the self-dispersible black pigment), $S_d$ represents a pigment density [g/cm$^3$] of the measurement sample (dispersion liquid of the self-dispersible black pigment), and Id represents a density [g/cm$^3$] of a measurement sample (dispersion medium).

In addition, the solid content concentration is the concentration of a solid content of an object substance (in this case, the self-dispersible black pigment) contained in the dispersion liquid. For example, when the constituent component of the self-dispersible black pigment is a carbon black, 1.7 is used as $S_d$. For example, when the dispersion medium is water, 1.0 is used as Id, and when other types of dispersion media or a mixture of dispersion media is used, a density corresponding thereto is used.

$$S_p=\{[(R_{av}/R_b)-1]\times R_b\}/(K_a\times\Psi_p) \quad \text{Equation (2)}$$

In the above formula, $S_p$ represents a specific surface area [m$^2$/g] of the self-dispersible black pigment in the ink composition, $R_{av}$ represents an inverse number of a measurement value (relaxation time) of the pulse NMR obtained using the measurement sample (dispersion liquid of the self-dispersible black pigment), $R_b$ represents an inverse number of a measurement value (relaxation time) of the pulse NMR obtained using the measurement sample (dispersion medium), and $K_a$ represents a coefficient ($K_a$=0.0016) obtained from the dispersion medium and the self-dispersible black pigment to be used.

As a method for adjusting the specific surface area of the self-dispersible black pigment, there may be mentioned a method in which the concentration and the addition amount of a surface treatment agent used for the surface treatment of the self-dispersible black pigment are adjusted, a method in which surface treatment conditions (such as a treatment temperature and/or a treatment time) are adjusted, or a method in which types of surface treatment agents are appropriately changed. In general, when the amount of functional groups introduced on the pigment surface is large, the specific surface area of the pigment tends to be larger. In addition, when the introduction amount of functional groups per unit area of the pigment surface is not changed between two types of self-dispersible pigments, the specific surface area of one self-dispersible black pigment having a smaller volume average particle diameter tends to be larger than that of the other pigment.

Since the ejection reliability and the color development property (black density) of the ink composition tend to be made more excellent, the average particle diameter (D50) of the self-dispersible black pigment is preferably in a range of 5 to 400 nm, more preferably in a range of 30 to 300 nm, and further preferably in a range of 50 to 200 nm.

In addition, unless otherwise particularly noted, the "average particle diameter" represents an average particle diameter on a volume basis. The average particle diameter may be measured by a particle size distribution measurement apparatus using a laser diffraction scattering method as a measurement principle. As the particle size distribution measurement apparatus, for example, "Microtrac Series" (manufactured by MicrotracBEL) may be used.

Since the color development property (black density) tends to be made more excellent, the content of the self-dispersible black pigment with respect to the total mass of the ink composition is preferably 0.1 percent by mass or more, more preferably 1.0 percent by mass or more, even preferably 2.0 percent by mass or more, further preferably 3.0 percent by mass or more, and particularly preferably 3.5 percent by mass or more. In addition, since rubbing fastness and ejection reliability tend to be made more excellent, the content of the self-dispersible black pigment with respect to the total mass of the ink composition is preferably 20 percent by mass or less, more preferably 15 percent by mass or less, even more preferably 10 percent by mass or less, further preferably 8 percent by mass or less, and particularly preferably 5 percent by mass or less.

In particular, the content of the self-dispersible black pigment with respect to the total mass of the ink composition is preferably 3 to 10 percent by mass. When the content of the self-dispersible black pigment is in the range described above, the color development property (black density) and the rubbing fastness both tend to be made more excellent.

1.2. Metal Alkali

The pigment printing ink jet ink composition according to this embodiment contains a metal alkali. Although the metal alkali is not particularly limited as long as being an alkali component including a metal element, for example, a metal hydroxide may be mentioned. In more particular, at least one selected from the group consisting of potassium hydroxide, sodium hydroxide, and lithium hydroxide may be mentioned. The metal alkali may be used alone, or at least two types thereof may be used in combination.

In the pigment printing ink jet ink composition according to this embodiment, the content of the self-dispersible black pigment described above with respect to the content of the metal alkali is 13 to 40 in terms of the composition ratio, preferably 15 to 35, more preferably 17 to 32, further preferably 20 to 30, and particularly preferably 22 to 28. When the composition ratio described above is 13 or more, a repulsion force by the hydrophilic group present on the surface of the self-dispersible black pigment becomes sufficient, and an excellent ink dispersion stability can be obtained. In addition, when the composition ratio described above is 40 or less, since an attack property by the metal alkali is suppressed, an excellent ink dispersion stability can be obtained.

Since the ejection reliability can be further improved, the content of the metal alkali with respect to the total mass of the ink composition is preferably 0.05 to 0.5 percent by mass, more preferably 0.1 to 0.3 percent by mass, and further preferably 0.1 to 0.2 percent by mass.

1.3. Water-Soluble Organic Solvent

The pigment printing ink jet ink composition according to this embodiment contains a water-soluble organic solvent. In addition, although the "water-soluble organic solvent" may be an organic solvent having a solubility to water, for example, an organic solvent having a water solubility of 10 g/100 g of water or more at 20° C. may be preferably used.

As the organic solvent, for example, an ester, an alkylene glycol ether, a cyclic ester, a nitrogen-containing solvent, an alcohol, or a polyvalent alcohol may be mentioned. As the nitrogen-containing solvent, for example, a cyclic amide or an acyclic amide may be mentioned. As the acyclic amide, for example, an alkoxyalkylamide may be mentioned.

As the ester, for example, there may be mentioned a glycol monoacetate, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, or methoxybutyl acetate; or a glycol diester, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, or dipropylene glycol acetate propionate.

As the alkylene glycol ether, a monoether or a diether of an alkylene glycol may be used, and an alkyl ether is preferable. As a concrete example, for example, there may be mentioned an alkylene glycol monoalkyl ether, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, ethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, or tripropylene glycol monobutyl ether; or an alkylene glycol dialkyl ether, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, or tripropylene glycol dimethyl ether.

As the cyclic ester, for example, there may be mentioned a cyclic ester (lactone), such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, or ε-decanolactone or a compound in which a hydrogen atom of a methylene group adjacent to the carbonyl group of one of the esters mentioned above is replaced by an alkyl group having 1 to 4 carbon atoms.

As the alkoxyalkylamide, for example, there may be mentioned 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-buthoxy-N,N-dimethylpropionamide, 3-n-buthoxy-N,N-diethylpropionamide, 3-n-buthoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, or 3-tert-butoxy-N,N-methylethylpropionamide.

As the cyclic amide, a lactam may be mentioned, and for example, a pyrrolidone, such as 2-pyrrolidone, 1-methyl-2-pyrrolidone, 1-ethyl-2-pyrrolidone, 1-propyl-2-pyrrolidone, or 1-butyl-2-pyrrolidone, may be mentioned. Those mentioned above are each preferable since film formation of the resin is promoted, and in particular, 2-pyrrolidone is more preferable.

As the alcohol, for example, a compound in which one hydrogen atom of an alkane is replaced by a hydroxy group may be mentioned. As the alkane, an alkane having 10 carbon atoms or less is preferable, an alkane having 6 carbon atoms or less is more preferable, and an alkane having 3 carbon atoms or less is further preferable. The number of carbon atoms of the alkane is one or more and is preferably two or more. The alkane may have either a linear structure or a branched structure. As the alcohol, for example, there may be mentioned methanol, ethanol, n-propyl alcohol, iso-propyl alcohol, n-butanol, 2-butanol, tert-butanol, iso-butanol, n-pentanol, 2-pentanol, 3-pentanol, tert-pentanol, 2-phenoxyethanol, benzyl alcohol, or phenoxypropanol.

The polyvalent alcohol is a compound having at least two hydroxy groups in its molecule. The polyvalent alcohol may be classified, for example, into an alkanediol and a polyol.

As the alkanediol, for example, a compound in which two hydrogen atoms of an alkane are replaced by two hydroxy groups may be mentioned. As the alkanediol, for example, there may be mentioned ethylene glycol (alias: ethane-1,2-diol), propylene glycol (alias: propane-1,2-diol), 1,2-butanediol, 1,2-pentanediol, 1,2-hexanediol, 1,2-octanediol, 1,3-propanediol, 1,3-butylene glycol (alias: 1,3-butanediol), 1,4-butanediol, 2,3-butanediol, 1,2-pentanediol, 1,5-pentanediol, 2,4-pentanediol, 2-methyl-1,3-propanediol, 3-methyl-1,3-butanediol, 3-methyl-1,5-pentanediol, 2-ethyl-1,3-hexanediol, 2-methyl-1,3-pentanediol, 3-methyl-1,5-pentanediol, 2-methylpentane-2,4-diol, 1,6-hexanediol, 2-ethyl-2-methyl-1,3-propanediol, or 2-methyl-2-propyl-1,3-propanediol.

As the polyol, for example, a condensate in which at least two alkanediol molecules are intermolecular condensed between hydroxy groups or a compound having at least three hydroxy groups may be mentioned.

As the condensate in which at least two alkanediol molecules are intermolecular condensed between hydroxy groups, for example, a dialkylene glycol, such as diethylene glycol or dipropylene glycol, or a trialkylene glycol, such as triethylene glycol or tripropylene glycol, may be mentioned.

The compound having at least three hydroxy groups is a compound which has a skeleton formed from an alkane or a polyether structure and also has at least three hydroxy groups. As the compound having at least three hydroxy groups, for example, there may be mentioned glycerin, trimethylolethane, trimethylolpropane, 1,2,5-hexanetriol, 1,2,6-hexanetriol, pentaerythritol, or a polyoxypropylenetriol.

The water-soluble organic solvent may be used alone, or at least two types thereof may be used in combination.

A content of the water-soluble organic solvent with respect to the total mass of the ink composition is preferably 5 to 40 percent by mass, more preferably 10 to 30 percent by mass, and further preferably 15 to 25 percent by mass.

The water-soluble organic solvent in the pigment printing ink jet ink composition according to this embodiment includes a compound having a SP value of 11 or more. Accordingly, the dispersion stability of a specific pigment having a large specific surface area is further improved, and a rapid increase in viscosity during drying is suppressed, so that the ejection reliability can be improved.

Since the ejection reliability tends to be made more excellent, the water-soluble organic solvent includes a compound having an SP value of preferably 11.5 or more, more preferably 12 or more, even more preferably 12.5 or more, further preferably 13 or more, even further preferably 13.5 or more, and particularly preferably 14 or more.

In addition, the "SP value" is called a compatibilization parameter and is also called a solubility parameter. The "SP value" represents the value calculated using Hansen's equation shown below. Hansen's solubility parameters are parameters obtained in a manner such that the solubility parameter introduced by Hildebrand is divided into three components, that is, the dispersion term ad, the polar term $\delta_p$, and the hydrogen bond term $\delta_h$, and is then displayed in a three-dimensional space. In this specification, the SP value is represented by $\delta[(\mathrm{cal/cm}^3)^{0.5}]$, and the value calculated using the following equation (3) is used.

$$\delta[(cal/cm^3)^{0.5}]=(\delta_d^2+\delta_p^2+\delta_h^2)^{0.5} \quad \text{Equation (3)}$$

As the compound having a SP value of 11 or more, for example, 1,2-hexanediol (SP value: 12.2), N-(2-hydroxyethyl)-2-pyrrolidone (SP value: 12.5), diethylene glycol (SP value: 13.7), propylene glycol (SP value: 14.2), ethylene glycol (SP value: 16.1), or glycerin (SP value: 16.7) may be mentioned. Among those mentioned above, glycerin (SP value: 16.7) or propylene glycol (SP value: 14.2) is more preferable.

Since the ejection reliability tends to be made more excellent, a content of the compound having a SP value of 11 or more with respect to the total mass of the ink composition is preferably 5 percent by mass or more, more preferably 10 percent by mass or more, and further preferably 15 percent by mass or more.

In addition, since the ejection reliability tends to be made further excellent, a content of a compound having a SP value of 16 or more with respect to the total mass of the ink composition is preferably 10 percent by mass or more and more preferably 15 percent by mass or more.

The water-soluble organic solvent in the pigment printing ink jet ink composition according to this embodiment includes no compound having a SP value of less than 11 at a content of more than 0.3 percent by mass with respect to the total mass of the ink composition. Accordingly, the dispersion stability of a specific pigment having a large specific surface area is further improved, and a rapid increase in viscosity during drying is suppressed, so that the ejection reliability can be improved.

Since the ejection reliability tends to be made more excellent, the water-soluble organic solvent includes no compound having an SP value of less than 11 at a content of preferably more than 0.25 percent by mass with respect to the total mass of the ink composition, more preferably more than 0.2 percent by mass, even more preferably more than 0.1 percent by mass, further preferably more than 0.05 percent by mass, and particularly preferably more than 0 percent by mass.

As the compound having a SP value of less than 11, for example, there may be mentioned 2-methylpentane-1,3-diol (SP value: 10.3), ethylene glycol monoethyl ether (SP value: 10.5), ethylene glycol monobutyl ether (SP value: 9.5), diethylene glycol monoethyl ether (SP value: 10.2), diethylene glycol monobutyl ether (SP value: 10.0), triethylene glycol monobutyl ether (SP value: 10.2), or 2-pyrrolidone (SP value: 10.9).

1.4. Water

The pigment printing ink jet ink composition according to this embodiment contains water. As the water, pure water, such as ion exchange water, ultrafiltration water, reverse osmosis water, or distilled water, or ultrapure water is preferably used. In particular, water sterilized by UV radiation or addition of hydrogen peroxide is preferable since generation of fungi and bacteria can be suppressed for a long time.

Although a content of the water is not particularly limited, the content thereof with respect to the total mass of the ink composition is preferably 30 to 95 percent by mass, more preferably 40 to 90 percent by mass, and further preferably 50 to 80 percent by mass.

1.5. Fixing Resin

The pigment printing ink jet ink composition according to this embodiment preferably contains a fixing resin. The fixing resin has a function to improve the adhesion of the component of the ink composition adhered to a recording medium and to further improve the rubbing fastness. As the fixing resin as described above, for example, a fixing resin formed from an urethane resin, an acrylic resin (including a styrene-acrylic resin), a fluorene resin, an olefin resin, a rosin-modified resin, a terpene resin, an ester resin, an amide resin, an epoxy resin, a vinyl chloride resin, a vinyl chloride-vinyl acetate copolymer, or an ethylene-vinyl acetate resin may be mentioned. Although those fixing resins each may be in the form of particles (resin particles) and are frequently handled in the form of an emulsion, the fixing resins each may also be in the form of a powder.

The urethane resin is a generic name of a resin having an urethane skeleton and is a resin including an urethane bond, an urea bond, or an allophanate bond formed by a reaction of an isocyanate group with an active hydrogen-containing group, such as a hydroxy group, an amino group, an urethane bond group, or a carboxy group. As the urethane resin, for example, a polyether type urethane resin having an ether skeleton in its main chain besides an urethane skeleton, a polyester type urethane resin having an ester skeleton in its main chain besides an urethane skeleton, or a polycarbonate type urethane resin having a carbonate skeleton in its main chain besides an urethane skeleton may be used.

The acrylic resin is a generic name of a polymer obtained by polymerization using as one component, at least an acrylic-based monomer, such as (meth)acrylic acid or a (meth)acrylic acid ester, and for example, a resin obtained from an acrylic-based monomer or a copolymer obtained from an acrylic-based monomer and another monomer may be mentioned. As the acrylic-based monomer, for example, acrylamide or acrylonitrile may also be used. In addition, the "(meth)acrylic" acid indicates either acrylic acid or methacrylic acid.

As the acrylic resin, for example, an acrylic-vinyl-based resin which is a copolymer between an acrylic-based monomer and a vinyl-based monomer, such as a copolymer between an acrylic-based monomer and styrene, may be mentioned. In particular, a styrene-acrylic resin is a copolymer formed from a styrene monomer and an acrylic-based monomer, and for example, a styrene-acrylic acid copolymer, a styrene-methacrylic acid copolymer, a styrene-methacrylic acid-acrylate copolymer, a styrene-α-methylstyrene-acrylic acid copolymer, or a styrene-α-methylstyrene-acrylic acid-acrylate copolymer may be mentioned.

The olefin resin is a resin having a structure derived from an olefin, such as ethylene, propylene, or butylene, and may be used after being appropriately selected from known olefin resins.

The fixing resin may be used alone, or at least two types thereof may be used in combination.

As the fixing resin, a commercial product may also be used, and for example, Takelac WS5100 (crosslinkable urethane resin, polycarbonate-base, manufactured by Mitsui Chemicals, Inc.), Takelac W6110 (non-crosslinkable urethane resin, polycarbonate-base, manufactured by Mitsui Chemicals, Inc.), or Takelac W5661 (non-crosslinkable urethane resin, polyether-base, manufactured by Mitsui Chemicals, Inc.) may be mentioned.

Among those mentioned above, since the rubbing fastness tends to be made more excellent, the fixing resin is preferably an urethane resin having a polycarbonate skeleton. As the "polycarbonate skeleton", for example, a skeleton represented by the following formula (4) is preferable.

$$—O[—(C{=}O)—O—R—O]_n— \quad \text{Formula (4)}$$

In the above formula, R represents a linear, branched, or cyclic alkylene group, the alkylene group may also include an ether bond and/or an ester bond, and n represents an integer of 1 or more.

In particular, since the rubbing fastness tends to be made more excellent, the fixing resin is preferably an urethane resin having a polycarbonate skeleton and is more preferably a reactive urethane resin having a block isocyanate.

The "reactive urethane resin having a block isocyanate" is a crosslinkable urethane resin including a blocked isocyanate group in which the isocyanate group is chemically protected by a blocking agent, that is, capping or blocking is performed. The blocked isocyanate group is deprotected and activated by heating, and for example, the bond, such as an urethane bond, an urea bond, or an allophanate bond, is formed.

The number of blocked isocyanate groups of the reactive urethane resin having a block isocyanate is preferably at least three in one molecule, and in the case as described above, by the reaction of the active isocyanate groups, a crosslinked structure is formed.

Although the blocking agent inactivates the isocyanate group by blocking, the blocking agent regenerates or activates the isocyanate group after deblocking, and in addition, in the state in which the isocyanate group is blocked or is deblocked, the blocking agent also has a catalytic action to activate the isocyanate group.

As the blocking agent, for example, there may be mentioned an imidazole-based compound, an imidazoline-based compound, a pyrimidine-based compound, a guanidine-based compound, an alcohol-based compound, a phenol-based compound, an activated methylene-based compound, an amine-based compound, an imine-based compound, an oxime-based compound, a carbamic acid-based compound, an urea-based compound, an acid amide-based (lactam-based) compound, an acid imide-based compound, a triazole-based compound, a pyrazole-based compound, a mercaptan-based compound, or a bisulfite.

A content of the fixing resin with respect to the total mass of the ink composition is preferably 3 to 10 percent by mass, more preferably 4 to 9 percent by mass, and further preferably 5 to 8 percent by mass. When the content of the fixing resin is in the range described above, the rubbing fastness, and the ejection reliability and the storage stability tend to be improved with a good balance.

1.6. Surfactant

The pigment printing ink jet ink composition according to this embodiment may also contain a surfactant. The surfactant has a function to improve wettability to a recording medium by decreasing the surface tension of the ink composition. Among the surfactants, for example, an acetylene glycol-based surfactant, a silicone-based surfactant, or a fluorine-based surfactant may be preferably used.

Although the acetylene glycol-based surfactant is not particularly limited, for example, there may be mentioned Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, or DF110D (trade name, manufactured by Air Products & Chemicals Inc.); Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, or AE-3 (trade name, manufactured by Nisshin Chemical Industry Co., Ltd.); or Acetylenol E00, E00P, E40, or E100 (trade name, manufactured by Kawaken Fine Chemicals Co., Ltd.).

Although the silicone-based surfactant is not particularly limited, a polysiloxane-based compound may be preferably mentioned. Although the polysiloxane-based compound is not particularly limited, for example, a polyether modified organosiloxane may be mentioned. As a commercial product of the polyether modified organosiloxane, for example, there may be mentioned BYK-306, BYK-307, BYK-333, BYK-341, BYK-345, BYK-346, or BYK-348 (trade name, manufactured by BYK Japan KK); KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.); or Silface SAG002, 005, 503A, or 008 (trade name, manufactured by Nisshin Chemical Industry Co., Ltd.).

As the fluorine-based surfactant, a fluorine modified polymer may be preferably used, and as a concrete example, BYK-3440 (trade name, manufactured by BYK Japan KK); Surflon S-241, S-242, or S-243 (trade name, manufactured by AGC Seimi Chemical Co., Ltd.); or Ftergent 215 M (trade name, manufactured by Neos Co., Ltd.) may be mentioned.

The surfactant may be used alone, or at least two types thereof may be used in combination.

A content of the surfactant with respect to the total mass of the ink composition is preferably 0.1 to 2 percent by mass, more preferably 0.4 to 1.5 percent by mass, and further preferably 0.5 to 1.0 percent by mass.

1.7. Other Components

The pigment printing ink jet ink composition according to this embodiment may also contain, if needed, additives, such as a pH adjuster, an antiseptic/fungicide agent, an antirust agent, a chelating agent, a viscosity adjuster, a solubilizing agent, and/or an antioxidant. When those additives are contained, a content thereof with respect to the total mass of the ink composition is preferably 0.1 to 5 percent by mass, more preferably 0.1 to 3 percent by mass, and further preferably 0.1 to 1 percent by mass.

1.8. Preparation Method and Physical Properties of Ink Composition

The pigment printing ink jet ink composition according to this embodiment can be obtained in a manner such that the components described above are mixed together in an arbitrary order, and if needed, impurities are removed by filtration or the like. As a mixing method for the components, a method in which materials are sequentially added in a container equipped with a stirring device, such as a mechanical stirrer or a magnetic stirrer, and are then mixed and stirred may be preferably used. As a filtration method, for example, centrifugal filtration or filter filtration may be performed, if needed.

The pigment printing ink jet ink composition according to this embodiment is applied to a recording medium by an ink jet method. Hence, in view of the balance between recording quality and reliability as an ink jet recording ink, the pigment printing ink jet ink composition has a surface tension at 25° C. of preferably 10 to 40 Nm/m and more preferably 25 to 40 Nm/m. The surface tension may be measured such that, for example, by using an automatic surface tensiometer CBVP-Z (trade name, manufactured by Kyowa Interface Science Co., Ltd.), a surface tension at which a platinum plate is wetted with the ink in an environment at 25° C. is confirmed.

In addition, from a view similar to that described above, a viscosity of the pigment printing ink jet ink composition at 20° C. is preferably 2 to 15 mPas, more preferably 2 to 5 mPas, and further preferably 2 to 3.6 mPas. The viscosity may be measured in an environment at 20° C., for example, using a viscoelastic test device MCR-300 (trade name, manufactured by Pysica).

2. Ink Jet Recording Method

An ink jet recording method according to one embodiment of the present disclosure includes an ink adhesion step of ejecting the pigment printing ink jet ink composition described above from an ink jet head so as to be adhered to a cloth, and a treatment liquid adhesion step of ejecting a treatment liquid containing a cationic compound from the ink jet head described above so as to be adhered to the cloth, and the ink adhesion step and the treatment liquid adhesion step are performed on the same scanning region of the cloth by the same main scanning.

According to the recording method of this embodiment, since the pigment printing ink jet ink composition described above is used, excellent color development property (black density) and ejection reliability can be obtained.

Hereinafter, the individual steps of the recording method according to this embodiment will be described.

2.1. Ink Adhesion Step

The recording method according to this embodiment includes an ink adhesion step of ejecting the pigment printing ink jet ink composition described above from an ink jet head so as to be adhered to a cloth.

Although a raw material forming the cloth is not particularly limited, for example, there may be mentioned natural fibers formed from cotton, hemp, wool, silk, or the like, synthetic fibers formed from a polypropylene, a polyester, an acetate, a triacetate, a polyamide, a polyurethane, or the like, or biodegradable fibers formed from a polylactic acid or the like, and blended fibers formed from at least one of those mentioned above may also be used. As the cloth, the fibers mentioned above may be formed into any one of a woven cloth, a knitted cloth, and a non-woven cloth.

In this embodiment, as the form of the cloth, for example, fabrics, clothes, and other accessories may be mentioned. In the fabrics, a woven fabric, a knitted fabric, and a non-woven fabric are included. In the clothes and other accessories, sewn products, such as a T shirt, a handkerchief, a scarf, a towel, a handbag, and a fabric-made bag; furniture, such as a curtain, a sheet, a bed cover, and wallpaper; and fabrics before and after cutting to be used as materials to be sewn. As the forms of those fabrics, for example, there may be mentioned a fabric having a long length in a roll shape, a fabric cut to have a predetermined size, and a fabric having a product shape.

As the cloth, a cotton cloth colored in advance with a dye may also be used. As the dye to be used to dye the cloth in advance, for example, a water-soluble dye, such as an acidic dye or a basic dye, a disperse dye using a dispersant, or a reactive dye may be mentioned. When a cotton cloth is used as the cloth, a reactive dye suitable for dyeing cotton is preferably used.

An adhesion amount of the pigment printing ink jet ink composition per unit area of the recording region of the cloth is preferably 10 to 40 $g/m^2$, more preferably 15 to 35 $g/m^2$, and further preferably 20 to 30 $g/m^2$.

In addition, when the ink jet head has, in a nozzle forming surface, a first nozzle line to eject the ink composition and a second nozzle line to eject the ink composition (this case will be described later), the adhesion amount of the pigment printing ink jet ink composition per unit area of the recording region of the cloth is preferably 20 to 80 $g/m^2$, more preferably 30 to 70 $g/m^2$, and further preferably 40 to 60 $g/m^2$. When the adhesion amount of the ink composition is in the range described above, the color development property (black density) tends to be made more excellent.

The recording method according to this embodiment performs the ink adhesion step and the treatment liquid adhesion step which will be described later on the same scanning region of the cloth by the same main scanning. As described above, when the ink composition and the treatment liquid are adhered to the same scanning region of the cloth by the same main scanning (by transferring the ink jet head in a direction orthogonal to the transport direction of the cloth) (this method is called a "wet-on-wet method"), the compositions each in the form of a liquid are brought into contact with each other. Accordingly, since a reaction between the ink composition and the treatment liquid is likely to proceed, and a fixability of the ink to the cloth surface is made preferable, the color development property (black density) is further improved.

In addition, since the treatment liquid is applied by an ink jet method, compared to the case in which the application is performed using a spray or the like instead of using an ink jet method, the color development property (black density) tends to be made more excellent. The reason for this is believed to be that when the application is performed by an ink jet method, since an ejection amount of the treatment liquid can be controlled to be small, and in addition, the treatment liquid can be immediately brought into contact with the ink by a wet-on-wet method, the reaction between the treatment liquid and the ink is likely to proceed. On the other hand, in the case in which the application is performed by a spray or the like instead of using an ink jet method, since the ejection amount of the treatment liquid cannot be easily controlled to be small, and in addition, since a general drying step is required to be performed, the ink and the treatment liquid are not immediately brought into contact with each other unlike the case of the wet-on-wet method, the reaction between the ink and the treatment liquid is not likely to proceed. That is, after a large amount of the treatment liquid is applied to the cloth by a spray or the like and is then dried, since the treatment liquid itself permeates in the cloth, and since a reaction between the ink and a component of the treatment liquid thus dried is a solid/liquid reaction, an ink landed after the treatment liquid is landed is not immediately aggregated, and the color development property (black density) tends to be made inferior.

In the ink adhesion step, besides the pigment printing ink jet ink composition described above, a color ink composition may also be adhered.

<Color Ink Composition>

The color ink composition contains a colorant, such as a cyan, a yellow, or a magenta colorant, other than a black colorant. Components other than the colorant, contents thereof, and the like may be made similar to those of the pigment printing ink jet ink composition described above.

As the colorant, a dye and a pigment may be both used. Since being not likely to fade by light, gas, and/or the like, a pigment is preferably used. Since an image formed on a recording medium using a pigment is excellent not only in image quality but also in water resistance, gas resistance, a light resistance, and the like, a preserving property is made preferable. In particular, this characteristic is significant when an image is formed on a recording medium which is a low-permeating substrate or a non-permeating substrate.

Although the pigment is not particularly limited, an inorganic pigment or an organic pigment may be mentioned. As the inorganic pigment, for example, titanium oxide or iron oxide may be used. In addition, as the organic pigment, for example, an azo pigment, a polycyclic pigment, a nitro pigment, or a nitroso pigment may be used. As the azo pigment, for example, an azo lake, an insoluble azo pigment, a condensed azo pigment, or a chelating azo pigment may be mentioned. As the polycyclic pigment, for example, a phthalocyanine pigment, a perylene pigment, a perinone pigment, an anthraquinone pigment, or a quinophthalone pigment may be mentioned.

Although a pigment used for a white ink is not particularly limited, for example, there may be mentioned a white inorganic pigment, such as C.I. Pigment 6, 18, or 21, titanium oxide, zinc oxide, zinc sulfide, antimony oxide, magnesium oxide, or zirconium oxide. Besides the white inorganic pigments mentioned above, white hollow resin fine particles or a white organic pigment, such as polymer particles, may also be used.

Although a pigment used for a yellow ink is not particularly limited, for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, or 180.

Although a pigment used for a magenta ink is not particularly limited, for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, or 245, or C.I. Pigment Violet 19, 23, 32, 33, 36, 38, 43, or 50.

Although a pigment used for a cyan ink is not particularly limited, for example, there may be mentioned C.I. Pigment Blue 1, 2, 3, 15, 15:1, 15:2, 15:3, 15:34, 15:4, 16, 18, 22, 25, 60, 65, or 66, or C.I. Vat Blue 4 or 60.

Although a pigment used for a color ink other than a magenta, a cyan, and a yellow ink is not particularly limited, for example, there may be mentioned C.I. Pigment Green 7 or 10, C.I. Pigment Brown 3, 5, 25, or 26, or C.I. Pigment Orange 1, 2, 5, 7, 13, 14, 15, 16, 24, 34, 36, 38, 40, 43, or 63.

Although a pearl pigment is not particularly limited, for example, there may be mentioned a pigment, such as titanium dioxide-coated mica, fish scale foil, or bismuth oxychloride, having a pearly gloss or an interference gloss.

Although a metallic pigment is not particularly limited, for example, there may be mentioned particles formed from a single substance, such as aluminium, silver, gold, platinum, nickel, chromium, tin, zinc, indium, titanium, or copper, or from an alloy containing at least one of the substances mentioned above.

When a pigment is used as the colorant, the pigment is preferably configured so as to be stably dispersed and maintained in water. As a method therefor, for example, there may be mentioned a method in which a pigment is dispersed using a resin dispersant, such as a water-soluble resin and/or a water-dispersible resin (hereinafter, a pigment treated by this method may be called "resin dispersion pigment" in some cases), a method in which a pigment is dispersed by a dispersant (hereinafter, a pigment treated by this method may be called "dispersant dispersion pigment"

in some cases), or a method in which hydrophilic functional groups are chemically and/or physically introduced on pigment particle surfaces so that a pigment can be dispersed and/or dissolved in water without using the resin or the dispersant described above (hereinafter, a pigment treated by this method may be called "surface-treated pigment" in some cases).

The color ink composition may use any one of the resin dispersion pigment, the dispersant dispersion pigment, and the surface-treated pigment, and if needed, although at least two types of pigments described above may be used in combination, the resin dispersion pigment is preferably contained.

As the resin dispersant used for the resin dispersion pigment, for example, there may be mentioned a poly(vinyl alcohol), a polyacrylic acid, an acrylic acid-acrylonitrile copolymer, a vinyl acetate-acrylate copolymer, an acrylic acid-acrylate copolymer, a styrene-acrylic acid copolymer, a styrene-methacrylic acid copolymer, a styrene-methacrylic acid-acrylate copolymer, a styrene-$\alpha$-methylstyrene-acrylic acid copolymer, a styrene-$\alpha$-methylstyrene-acrylic acid-acrylate copolymer, a styrene-maleic acid copolymer, a styrene-maleic anhydride copolymer, a vinylnaphthalene-acrylic acid copolymer, a vinylnaphthalene-maleic acid copolymer, a vinyl acetate-maleate copolymer, a vinyl acetate-crotonic acid copolymer, a vinyl acetate-acrylic acid copolymer, or a salt of at least one of those mentioned above. Among those mentioned above, a copolymer formed from a monomer having a hydrophobic functional group and a monomer having a hydrophilic functional monomer or a polymer formed from a monomer having both a hydrophobic functional group and a hydrophilic functional monomer is preferable. As the form of the copolymer, any one of a random copolymer, a block copolymer, an alternate copolymer, and a graft copolymer may be used.

Although a content rate of the resin dispersant may be appropriately selected in accordance with a pigment to be dispersed, the content rate of the resin dispersant with respect to 100 parts by mass of the pigment in the color ink composition is preferably 5 to 200 parts by mass and more preferably 30 to 120 parts by mass.

As the dye, an acidic dye is preferable. As the acidic dye, for example, an azo-based, an anthraquinone-based, a pyrazolone-based, a phthalocyanine-based, a xanthene-based, an indigoid-based, or a triphenylmethane-based dye may be mentioned. As a concrete example of the acidic dye, for example, C.I. Acid Yellow 17, 23, 42, 44, 79, or 142, C.I. Acid Red 52, 80, 82, 249, 254, or 289, C.I. Acid Blue 9, 45, or 249, C.I. Acid Black 1, 2, 24, or 94 may be mentioned. The dye may be used alone, or at least two types thereof may be used in combination.

A lower limit of a content of the colorant contained in the color ink composition with respect to a total mass thereof is preferably 0.5 percent by mass or more, more preferably 1 percent by mass or more, and further preferably 3 percent by mass or more. On the other hand, an upper limit of the content of the colorant contained in the color ink composition with respect to the total mass thereof is preferably 10 percent by mass or less, more preferably 7 percent by mass or less, and further preferably 6 percent by mass or less. Since the content of the colorant is in the range described above, an image formed on a recording medium has excellent water resistance, gas resistance, light resistance, and the like and also has a preferable ink preserving property.

2.2. Treatment Liquid Adhesion Step

The recording method according to this embodiment includes a treatment liquid adhesion step of ejecting a treatment liquid containing a cationic compound from an ink jet head so as to be adhered to a cloth.

In addition, the treatment liquid is not an ink composition used to color a cloth and is an auxiliary liquid used together with the ink composition. In addition, the treatment liquid is preferably a liquid to aggregate the component of the ink composition or to increase the viscosity thereof and is more preferably a liquid containing a component to aggregate the component of the ink composition or to increase the viscosity thereof. Although the treatment liquid may also contain a colorant, a content thereof with respect a total mass of the treatment liquid is preferably 0.2 percent by mass or less, more preferably 0.1 percent by mass or less, and further preferably 0.05 percent by mass or less, and a lower limit thereof is 0 percent by mass. The treatment liquid preferably contains no colorant.

An adhesion amount of the treatment liquid per unit area of the recording region of the cloth is preferably 10 to 40 $g/m^2$, more preferably 15 to 35 $g/m^2$, and further preferably 20 to 30 $g/m^2$.

<Treatment Liquid>

Hereinafter, individual components contained in the treatment liquid will be described. In addition, the treatment liquid may contain components similar to those of the pigment printing ink jet ink composition described above, and the contents of the components may also be made similar to those described above.

[Aggregating Agent]

The treatment liquid contains an aggregating agent. The aggregating agent is able to rapidly react with the component, such as the pigment or the resin, contained in the ink composition. Accordingly, the dispersion state of the component in the ink composition is destroyed, the component is aggregated, and an aggregate thus formed disturbs the permeation of the pigment in a recording medium; hence, an excellent improvement in image quality of a recorded image is believed to be obtained.

As the aggregating agent, for example, a polyvalent metal salt, a cationic compound, such as a cationic resin or a cationic surfactant, or an organic acid may be mentioned. Those aggregating agents may be used alone, or at least two types thereof may be used in combination. Among those aggregating agents, since a reactivity with the component contained in the ink composition is superior, a cationic compound is preferably used.

The polyvalent metal salt mentioned above is formed from an at least divalent metal ion and an anionic ion bonded thereto and is a water-soluble compound. As a concrete example of the polyvalent metal ion, for example, there may be mentioned a divalent metal ion, such as Ca2+, $Cu^{2+}$, $Ni^{2+}$, $mg^{2+}$, $Zn^{2+}$, or $Ba^{2+}$, or a trivalent metal ion, such as $Al^{3+}$, $Fe^{3+}$, or $Cr^{3+}$. As the anionic ion, for example, $Cl^-$, $I^-$, $Br^-$, $SO_4^{2-}$, $Clo^{3-}$, $NO^{3-}$, $HCOO^-$, or $CH_3COO^-$ may be mentioned. Among those polyvalent metal salts, in view of the stability of the treatment liquid and the reactivity as the aggregating agent, a calcium salt or a magnesium salt is preferably used.

As the cationic resin, for example, a cationic urethane resin, a cationic olefin resin, or a cationic amine-based resin may be mentioned. As the cationic amine-based resin, any resin having an amino group may be used, and for example, an allylamine resin, a polyamine resin, a quaternary ammonium salt polymer, or a polyamide resin may be mentioned. As the polyamine resin, a resin having an amino group in its main skeleton may be mentioned. As the allylamine resin, a resin having a structure derived from an allyl group in its main skeleton may be mentioned. As the quaternary ammonium salt polymer, a resin having a quaternary ammonium salt in its structure may be mentioned. As the polyamide resin, a resin having an amide group in its main skeleton and an amino group at its side chain may be mentioned. Among the cationic resins, since being not only excellent in reactivity but also being easily available, the cationic amine-based resin is preferable.

As the organic acid, for example, there may be mentioned a poly(meth)acrylic acid, formic acid, acetic acid, propionic acid, glycolic acid, oxalic acid, malonic acid, malic acid, maleic acid, ascorbic acid, succinic acid, glutaric acid, adipic acid, fumaric acid, citric acid, tartaric acid, lactic acid, pyruvic acid, pyrrolidonecarboxylic acid, pyronecarboxylic acid, pyrrolecarboxylic acid, furancarboxylic acid, pyridinecarboxylic acid, coumalic acid, thiophenecarboxylic acid, or nicotinic acid, or a derivative or a salt of at least one of those mentioned above. The organic acid may be used alone, or at least two types thereof may be used in combination. An organic acid salt which is also a polyvalent metal salt is included in the polyvalent metal salt.

A concentration of the aggregating agent in the treatment liquid with respect to a total mass thereof is preferably 0.5 percent by mass or more, more preferably 1 percent by mass or more, and further preferably 3 percent by mass or more. In addition, since the concentration of the aggregating agent in the treatment liquid with respect to the total mass thereof is preferably 20 percent by mass or less, more preferably 15 percent by mass or less, further preferably 10 percent by mass or less, and particularly preferably 8 percent by mass or less.

[Water]

The treatment liquid may also contain water. The water to be used may be made similar to that of the pigment printing ink jet ink composition described above.

A content of the water with respect to the total mass of the treatment liquid is preferably 50 to 99 percent by mass, more preferably 60 to 98 percent by mass, further preferably 70 to 97 percent by mass, and particularly preferably 80 to 96 percent by mass.

[Surfactant]

The treatment liquid may also contain a surfactant. The surfactant to be used and the content thereof may be made similar to those of the pigment printing ink jet ink composition described above.

[Other Components]

The treatment liquid may also contain an organic solvent. In addition, if needed, the treatment liquid may also contain additives, such as a pH adjuster, an antiseptic/fungicide agent, an antirust agent, a chelating agent, a viscosity adjuster, a solubilizing agent, and/or an antioxidant.

2.3. Coating Liquid Adhesion Step

The recording method according to this embodiment may further include a coating liquid adhesion step of ejecting a coating liquid containing resin particles from an ink jet head so as to be adhered to a cloth.

Since the coating liquid adhesion step is included, the rubbing fastness can be further improved. On the other hand, when the coating liquid adhesion step is included, a liquid amount on the cloth is increased, and the pigment in the ink composition is transferred in the cloth; hence, heretofore, the color development property is disadvantageously liable to be degraded. However, by the recording method according to this embodiment, while an excellent color development property (black density) is maintained, the rubbing fastness can also be made more excellent.

The coating liquid adhesion step is preferably performed simultaneously with or after the ink adhesion step described above. Since the coating liquid adhesion step is performed in the order as described above, the rubbing fastness tends to be made more excellent. In addition, when the coating liquid adhesion step is performed after the ink adhesion step described above, the coating liquid adhesion step may be performed either before or after the ink is dried. In order to more effectively obtain the effect of the present disclosure, the coating liquid adhesion step is preferably performed before the ink is dried.

An adhesion amount (ejection amount) of the coating liquid per unit area of the recording region of the cloth is preferably 2 to 40 $g/m^2$, more preferably 3 to 30 $g/m^2$, even more preferably 4 to 20 $g/m^2$, and further preferably 5 to 15 $g/m^2$.

In the coating liquid adhesion step, when the ejection amount of the ink composition in the ink adhesion step described above is assumed to be 1, the ejection amount of the coating liquid in the coating liquid adhesion step is preferably 1.0 or less, more preferably 0.8 or less, even more preferably 0.6 or less, and further preferably 0.4 or less. Although a lower limit of the ejection amount of the coating liquid is not particularly limited, the lower limit described above is preferably 0.1 or more and more preferably 0.2 or more. When the ejection amount of the coating liquid is in the range described above, the color development property (black density) and the rubbing fastness tend to be improved with a good balance.

<Coating Liquid>

Hereinafter, individual components contained in the coating liquid will be described. In addition, the coating liquid may contain components similar to those of the pigment printing ink jet ink composition described above, and the contents of the components may also be made similar to those described above.

[Resin Particles]

The coating liquid contains resin particles. The resin particles may be made similar to the fixing resin in the form of particles which can be contained in the pigment printing ink jet ink composition described above.

Since the rubbing fastness tends to be made excellent, the resin particles are formed from an urethane resin having a polycarbonate skeleton and are preferably formed from a reactive urethane resin having a block isocyanate.

A content of the resin particles with respect to a total mass of the coating liquid is preferably 2 to 20 percent by mass, more preferably 4 to 18 percent by mass, and further preferably 6 to 15 percent by mass. When the content of the resin particles is in the range described above, the rubbing fastness and the ejection reliability of the coating liquid tend to be improved with a good balance.

[Water]

The coating liquid may also contain water. The water to be used and the content thereof may be made similar to those of the pigment printing ink jet ink composition described above.

[Organic Solvent]

The coating liquid may also contain an organic solvent. The organic solvent to be used and the content thereof may be made similar to those of the pigment printing ink jet ink composition described above.

[Metal Alkali]

The coating liquid may also contain a metal alkali. The metal alkali to be used and the content thereof may be made similar to those of the pigment printing ink jet ink composition described above.

[Surfactant]

The coating liquid may also contain a surfactant. The surfactant to be used and the content thereof may be made similar to those of the pigment printing ink jet ink composition described above.

[Other Components]

The coating liquid may also contain, if needed, additives, such as a pH adjuster, an antiseptic/fungicide agent, an antirust agent, a chelating agent, a viscosity adjuster, a solubilizing agent, and/or an antioxidant.

2.4. Heating Step

The recording method according to this embodiment may further include, after the ink adhesion step and the treatment liquid adhesion step described above, a step of heating the ink and the like adhered to the cloth.

Although a heating method is not particularly limited, for example, a heat press method, a normal pressure steam method, a high pressure steam method, or a thermofix method may be mentioned. A heat source for the heating is not particularly limited, and for example, an IR lamp may be used. A heating temperature is preferably set to a temperature at which the resin particles in the ink or the coating liquid are fused and at which the medium, such as water, is evaporated. For example, the heating temperature is preferably approximately 100° C. to 200° C., more preferably 170° C. or less, and further preferably 160° C. or less. In this case, the heating temperature in the heating step indicates a surface temperature of an image or the like formed on the cloth. Although a heating time is not particularly limited, for example, the time is preferably 30 seconds to 20 minutes and more preferably 1 to 10 minutes.

2.5. Other Steps

The recording method according to this embodiment may further include, after the heating step described above, a step of water washing and drying a printed cloth. In the water washing, if needed, as a soaping treatment, components, such as the ink, not fixed to the cloth may be washed out using a hot soap solution.

2.6. Ink Jet Printing Apparatus

One example of an ink jet printing apparatus which includes an ink jet head and which is applicable to the recording method according to this embodiment will be described with reference to FIGURE.

In addition, the ink jet printing apparatus used for illustration is a serial printer in which a recording ink jet head is mounted on a carriage to be transferred in a predetermined direction, and when the ink jet head is transferred in conjunction with the transfer of the carriage, liquid droplets are ejected on a cloth.

The ink jet printing apparatus (printer) is an apparatus to perform printing by landing liquid droplets on a cloth by an ink jet head functioning as an liquid ejection portion to eject fine liquid droplets of the ink composition or the treatment liquid. FIG. 1*s* a schematic perspective view showing an ink jet printing apparatus usable in this embodiment.

As shown in FIGURE, a printer 1 in this embodiment includes an ink jet head 3, a carriage 4, a main scanning mechanism 5, a platen roller 6, and a control portion (not shown) to control the whole operation of the printer 1. The carriage 4 mounts the ink jet head 3 and also detachably mounts liquid cartridges 7a, 7b, 7c, 7d, 7e, and 7f. The liquid cartridges 7a, 7b, 7c, 7d, 7e, and 7f receive the pigment printing ink jet ink composition and the treatment liquid to be supplied to the ink jet head 3, and if needed, also receive the coating liquid and the color ink composition (hereinafter, also referred to as “ink and the like” in some cases).

The main scanning mechanism 5 includes a timing belt 8 coupled to the carriage 4, a motor 9 to drive the timing belt 8, and a guide shaft 10. The guide shaft 10 is provided as a support member of the carriage 4 in a scanning direction of the carriage 4, that is, in a main scanning direction MS. The carriage 4 is driven by the motor 9 through the timing belt 8 and can be reciprocally transferred along the guide shaft 10. Accordingly, the main scanning mechanism 5 has a function to reciprocally transfer the carriage 4 in the main scanning direction MS.

The platen roller 6 has a function to transport a cloth 2 to be printed in a sub-scanning direction SS orthogonal to the above main scanning direction MS, that is, in a length direction of the cloth 2. Accordingly, the cloth 2 is transported in the sub-scanning direction SS. The carriage 4 mounting the ink jet head 3 can be reciprocally transferred in the main scanning direction MS which approximately coincides with a width direction of the cloth 2, and the ink jet head 3 is configured so as to be relatively scanned with respect to the cloth 2 in the main scanning direction MS and the sub-scanning direction SS.

The liquid cartridges 7a, 7b, 7c, 7d, 7e, and 7f are six independent liquid cartridges. In the liquid cartridges 7a, 7b, 7c, 7d, 7e, and 7f, the ink and the like can be received. In those liquid cartridges, the inks having a color, such as a black, a cyan, a magenta, a yellow, a white, and/or an orange color, the treatment liquid, and the coating liquid are respectively received and can be used in an arbitrary combination. Although FIGURE shows the six liquid cartridges, the number thereof is not limited thereto. At the bottoms of the liquid cartridges 7a, 7b, 7c, 7d, 7e, and 7f, supply ports (not shown) to supply the ink and the like received in the respective liquid cartridges to the ink jet head 3 are provided.

The ink jet head 3 is a device to spray the ink and the like supplied from the liquid cartridges 7a, 7b, 7c, 7d, 7e, and 7f from a plurality of nozzles so as to be adhered to the cloth 2 under the control of the control portion (not shown). The ink jet head 3 includes, in a surface (nozzle forming surface) facing the cloth 2 to which the ink and the like are adhered, a plurality of nozzles to eject the ink and the like so as to be adhered to the cloth 2. Those nozzles are arranged in lines to form nozzle lines, and the nozzle lines are arranged for respective types of ink and the like. The ink and the like are supplied from the respective liquid cartridges to the ink jet head 3 and are then ejected in the form of liquid droplets from the nozzles by an actuator (not shown) in the ink jet head 3. The liquid droplets of the ink and the like thus ejected are landed on the cloth 2 and adhered thereto, so that an image, a text, a pattern, a color, and/or the like is formed by the ink in a printing region of the cloth 2. In addition, in the carriage 4, a plurality of ink jet heads 3 may also be provided.

The ink jet head 3 preferably has in the nozzle forming surface, a first nozzle line to eject the pigment printing ink jet ink composition described above and a second nozzle line to eject the pigment printing ink jet ink composition described above. When the structure as described above is formed, the adhesion amount of the pigment printing ink jet ink composition described above can be easily controlled in a preferable range, and the color development property (black density) tends to be made more excellent. That is, in the structure as described above, the adhesion amount of the pigment printing ink jet ink composition described above per unit area of the recording region of the cloth can be easily controlled preferably at 20 to 80 g/m$^2$, more preferably at 30 to 70 g/m$^2$, and further preferably at 40 to 60 g/m$^2$.

The arrangement of the first nozzle line and the second nozzle line is not particularly limited, and the first nozzle line and the second nozzle line may be arranged to be adjacent to each other or may be arranged with another nozzle line interposed therebetween.

In addition, in the ink jet head 3, although a piezoelectric element is used as the actuator which is a driving device, the actuator is not limited thereto. For example, as the actuator, an electromechanical transducer to displace a vibration plate by electrostatic adsorption or an electrothermal transducer to eject liquid droplets of the ink composition by bubbles generated by heating may also be used.

The printer 1 may be provided with a drying device and/or a heating device (not shown). The drying device and the heating device are each a device to efficiently dry the ink and the like adhered to the cloth 2. As long as the drying device and the heating device are each provided at a position at which the cloth 2 can be heated and dried, the installation positions thereof are not particularly limited. In order to efficiently dry the ink and the like adhered to the cloth 2, for example, in the case shown in FIGURE, the drying device and the heating device can be installed at a position facing the ink jet head 3.

As the drying device and the heating device, for example, there may be mentioned a print heater mechanism in which the cloth 2 is brought into contact with a heat source for heating, a mechanism in which, for example, infrared rays or microwaves, such as electromagnetic waves having a maximum wave length of approximately 2,450 MHz, are radiated, or a dryer mechanism in which a hot wind is blown. The heating of the cloth 2 is performed before or simultaneously with the adhesion of the liquid droplets of the ink and the like ejected from the nozzle of the ink jet head 3 to the cloth 2. The control of the various heating conditions, such as a heating timing, a heating temperature, and a heating time, is performed by the control portion.

In addition, the drying device and the heating device may be installed downstream in the transport direction of the cloth 2. In the case described above, after an image is formed by the adhesion of the ink and the like ejected from the nozzle to the cloth 2, the heating is performed on the cloth 2. Accordingly, the drying property of the ink and the like adhered to the cloth 2 is improved.

3. Examples

Hereinafter, although the present disclosure will be described in more detail with reference to Examples, the present disclosure is not limited to the following Examples. Hereinafter, unless otherwise particularly noted, "%" is shown on a mass basis.

3.1. Preparation of Pigment Printing Ink Jet Ink Composition

After individual components were charged in a container to obtain one of the compositions shown in the following Tables 1 to 2, and ion exchange water was then added so that the total mass of each ink composition was 100 percent by mass, a mixture thus obtained was stirred and mixed for 2 hours by a magnetic stirrer and was then further processed by a dispersion treatment using a bead mill filled with zirconia beads having a diameter of 0.3 mm, so that the components were sufficiently mixed together. Subsequently, stirring was performed for 1 hour, and filtration was then performed using a 5-μm PTFE membrane filter, so that the pigment printing ink jet ink composition of each of Examples and Comparative Examples was obtained. In addition, in the columns of the pigment and the resin in the following Tables 1 to 2, a solid content which is an effective component is shown by percent by mass.

Pigment dispersion liquids A to C were each prepared by the following procedure. After 20 g of 5170 (trade name, manufactured by Degussa) which was a commercial carbon black was mixed with 500 g of water, this mixture was dispersed for 5 minutes by a domestic mixer. After a liquid thus obtained was received in a 3-L glass container equipped with a stirring device, while stirring was performed by the stirring device, an ozone-containing gas at an ozone concentration of 8 percent by mass was introduced at a rate of 500 mL/minute. In this case, by using an electrolytic generation type ozonizer (manufactured by Pelmelec Electrode Ltd.) as an ozone generator, ozone was generated. In addition, since an introduction time was adjusted in a range of from one minute to one hour, a desired surface modification could be performed. A dispersion raw liquid thus obtained was filtrated using a glass-fiber filter paper GA-100 (trade name, manufactured by Advantec Toyo Kaisha, Ltd.), and while the pH was adjusted to be 9 by addition of a 0.1-N potassium hydroxide solution, the liquid was condensed until the solid content concentration reached 20 percent by mass, so that the self-dispersible pigment dispersion liquid A was obtained. Except for that the concentration of the ozone-containing gas and the introduction time thereof are adjusted, the self-dispersible pigment dispersion liquids B and C were obtained in a manner similar to that described above.

A specific surface area [$m^2/g$] of the pigment in each pigment dispersion liquid was obtained by calculation from a measurement value obtained by a pulse NMR under the following measurement conditions using the following equations (1) and (2).

[Measurement Conditions]

Pulse NMR: Acorn Drop, manufactured by Xigo nanotools

Measurement Temperature: 30° C.

Measurement Sample: 0.5 mL

Measurement Sample A1: each pigment dispersion liquid

Measurement Sample A2: supernatant of Measurement Sample A1 after centrifugation (415,000G×60 minutes, 25° C.)

$$\Psi\rho=(S_c/S_d)/[(1-S_c)/T_d] \quad \text{Equation (1)}$$

In the above equation, $S_c$ represents a pigment solid content concentration (percent by mass) of the measurement sample A1, $S_d$ represents a density [$g/cm^3$] of the pigment of the measurement sample A1, $T_d$ represents a density [$g/cm^3$] of the supernatant of the measurement sample A2. In addition, $S_c$: pigment solid content concentration, $S_d$: density of pigment (carbon black: approximately 1.7), and $T_d$: density of the supernatant (when water is used, approximately 1.0) are all obtained by calculation from the composition of the ink composition.

$$S_p=\{(R_{av}/R_b)-1]\times R_b\}/(0.0016\times\Psi_p) \quad \text{Equation (2)}$$

In the above equation, $S_p$ represents a specific surface area [$m^2/g$] of the self-dispersible black pigment in the ink composition, $R_{av}$ represents an inverse value of a measurement value (relaxation time) of the pulse NMR obtained using the measurement sample A1, and $R_b$ represents an inverse value of a measurement value (relaxation time) of the pulse NMR obtained using the measurement sample A2.

3.2. Preparation of Treatment Liquid

After individual components were charged in a container to have the following composition, ion exchange water was added so that the total mass of the treatment liquid was 100 percent by mass, and by a process similar to that of the pigment printing ink jet ink composition described above, the treatment liquid was obtained.

[Treatment Liquid]

Calcium sulfate: 5 percent by mass

Surfynol 485: 0.50 percent by mass ion exchange water: balance

In addition, "Surfynol 485" is a trade name manufactured by Air Products & Chemicals Inc. and is an acetylene glycol-based surfactant.

3.3. Preparation of Coating Liquid

After individual components were charged in a container to have the following composition, ion exchange water was added so that the total mass of the coating liquid was 100 percent by mass, and by a process similar to that of the pigment printing ink jet ink composition described above, the coating liquid was obtained.

[Coating Liquid]

Crosslinkable polycarbonate-based urethane resin: 10 percent by mass glycerin: 20 percent by mass propylene glycol: 2 percent by mass NaOH: 0.10 percent by mass BYK348: 0.50 percent by mass ion exchange water: balance In addition, as the "crosslinkable polycarbonate-based urethane resin", Takelac WS5100 (trade name, manufactured by Mitsui Chemicals, Inc.) was used. In addition, "BYK348" is a trade name manufactured by BYK Japan KK and is a silicone-based surfactant.

TABLE 1

| Condition | | | Example 1 | Example 2 | Example 3 | Example 4 | Example 5 |
|---|---|---|---|---|---|---|---|
| Solid content concentration of ink composition % | Pigment | Pigment dispersion liquid A, specific surface area 55 $m^2/g$ | 4.0 | 3.0 | 10.0 | | 4.0 |
| | | Pigment dispersion liquid B, specific surface area 100 $m^2/g$ | — | — | — | 4.0 | — |
| | | Pigment dispersion liquid C, specific surface area 30 $m^2/g$ | — | — | — | — | — |
| | Fixing resin | Crosslinkable polycarbonate-based urethane resin | 6.0 | 6.0 | 6.0 | 6.0 | 3.0 |
| | | Non-crosslinkable polycarbonate-based urethane resin | — | — | — | — | — |
| | | Non-crosslinkable polyether-based urethane resin | — | — | — | — | — |
| | Organic solvent | Glycerin (SP value = 16.7) | 18 | 18 | 18 | 18 | 18 |
| | | Propylene glycol (SP value = 14.2) | 2 | 2 | 2 | 2 | 2 |
| | | 1,2 Hexanediol (SP value = 12.2) | — | — | — | — | — |
| | | 2-Pyrrolidone (SP value = 10.9) | — | — | — | — | — |
| | Metal alkali | NaOH | 0.15 | 0.1 | 0.3 | 0.3 | 0.15 |
| | | Composition ratio of self-dispersible pigment to metal alkali | 26.7 | 30.0 | 33.3 | 13.3 | 26.7 |
| | Others | BYK348 | 0.5 | 0.5 | 0.5 | 0.5 | 0.5 |
| | | Ion exchange water | Balance | Balance | Balance | Balance | Balance |
| Recording method | Treatment liquid | Same main scanning ejection | Yes | Yes | Yes | Yes | Yes |
| | | In-advance coating | — | — | — | — | — |
| | Bk ink | One-line ejection amount 25 $g/m^2$ | Yes | Yes | Yes | Yes | Yes |
| | | Two-line ejection amount 50 $g/m^2$ | — | — | — | — | — |
| | Coating liquid | Ejection amount 10 $g/m^2$ | — | — | — | — | — |
| | | Ejection amount 20 $g/m^2$ | — | — | — | — | — |
| | | Coating liquid/ink ratio in ejection amount | — | — | — | — | — |
| Evaluation result | Ejection evaluation | Clogging evaluation (ejection reliability) | A | A | B | A | A |
| | Printing performance | Color development property (black density) | A | B | A | A | A |
| | | Rubbing fastness | A | A | B | A | B |
| | Physical property evaluation | Storage stability | A | A | B | A | A |

| Condition | | | Example 6 | Example 7 | Example 8 | Example 9 | Example 10 |
|---|---|---|---|---|---|---|---|
| Solid content concentration of ink composition % | Pigment | Pigment dispersion liquid A, specific surface area 55 $m^2/g$ | 4.0 | 4.0 | 4.0 | 4.0 | 4.0 |
| | | Pigment dispersion liquid B, specific surface area 100 $m^2/g$ | — | — | — | — | — |
| | | Pigment dispersion liquid C, specific surface area 30 $m^2/g$ | — | — | — | — | — |
| | Fixing resin | Crosslinkable polycarbonate-based urethane resin | 10.0 | — | — | 6.0 | 6.0 |
| | | Non-crosslinkable polycarbonate-based urethane resin | — | 6.0 | — | — | — |
| | | Non-crosslinkable polyether-based urethane resin | — | — | 6.0 | — | — |
| | Organic solvent | Glycerin (SP value = 16.7) | 18 | 18 | 18 | 18 | 18 |
| | | Propylene glycol (SP value = 14.2) | 2 | 2 | 2 | 2 | 2 |
| | | 1,2 Hexanediol (SP value = 12.2) | — | — | — | — | — |
| | | 2-Pyrrolidone (SP value = 10.9) | — | — | — | — | — |
| | Metal alkali | NaOH | 0.15 | 0.15 | 0.15 | 0.15 | 0.15 |
| | | Composition ratio of self-dispersible pigment to metal alkali | 26.7 | 26.7 | 26.7 | 26.7 | 26.7 |
| | Others | BYK348 | 0.5 | 0.5 | 0.5 | 0.5 | 0.5 |
| | | Ion exchange water | Balance | Balance | Balance | Balance | Balance |
| Recording method | Treatment liquid | Same main scanning ejection | Yes | Yes | Yes | Yes | Yes |
| | | In-advance coating | — | — | — | — | — |
| | Bk ink | One-line ejection amount 25 $g/m^2$ | Yes | Yes | Yes | Yes | Yes |
| | | Two-line ejection amount 50 $g/m^2$ | — | — | — | — | — |
| | Coating liquid | Ejection amount 10 $g/m^2$ | — | — | — | — | — |
| | | Ejection amount 20 $g/m^2$ | — | — | — | — | — |
| | | Coating liquid/ink ratio in ejection amount | — | — | — | — | — |

TABLE 1-continued

| | | | | | | | |
|---|---|---|---|---|---|---|---|
| Evaluation result | Ejection evaluation | Clogging evaluation (ejection reliability) | B | A | A | B | B |
| | Printing performance | Color development property (black density) | A | A | A | A | A |
| | | Rubbing fastness | A | B | B | A | A |
| | Physical property evaluation | Storage stability | B | A | A | A | A |

TABLE 2

| | | Condition | Example 11 | Example 12 | Example 13 | Example 14 | Example 15 |
|---|---|---|---|---|---|---|---|
| Solid content concentration of ink composition % | Pigment | Pigment dispersion liquid A, specific surface area 55 $m^2/g$ | 4.0 | 4.0 | 4.0 | 4.0 | 4.0 |
| | | Pigment dispersion liquid B, specific surface area 100 $m^2/g$ | — | — | — | — | — |
| | | Pigment dispersion liquid C, specific surface area 30 $m^2/g$ | — | — | — | — | — |
| | Fixing resin | Crosslinkable polycarbonate-based urethane resin | 6.0 | 6.0 | 6.0 | 6.0 | 6.0 |
| | | Non-crosslinkable polycarbonate-based urethane resin | — | — | — | — | — |
| | | Non-crosslinkable polyether-based urethane resin | — | — | — | — | — |
| | Organic solvent | Glycerin (SP value = 16.7) | 18 | 18 | 18 | 18 | 18 |
| | | Propylene glycol (SP value = 14.2) | 2 | 2 | 2 | 2 | 2 |
| | | 1,2 Hexanediol (SP value = 12.2) | — | — | — | — | — |
| | | 2-Pyrrolidone (SP value = 10.9) | — | — | — | — | — |
| | Metal alkali | NaOH | 0.15 | 0.15 | 0.15 | 0.15 | 0.15 |
| | | Composition ratio of self-dispersible pigment to metal alkali | 26.7 | 26.7 | 26.7 | 26.7 | 26.7 |
| | Others | BYK348 | 0.5 | 0.5 | 0.5 | 0.5 | 0.5 |
| | | Ion exchange water | Balance | Balance | Balance | Balance | Balance |
| Recording method | Treatment liquid | Same main scanning ejection | Yes | Yes | Yes | Yes | — |
| | | In-advance coating | — | — | — | — | Yes |
| | Bk ink | One-line ejection amount 25 $g/m^2$ | — | Yes | — | Yes | Yes |
| | | Two-line ejection amount 50 $g/m^2$ | Yes | — | Yes | — | — |
| | Coating liquid | Ejection amount 10 $g/m^2$ | — | Yes | Yes | — | — |
| | | Ejection amount 20 $g/m^2$ | — | — | — | Yes | — |
| | | Coating liquid/ink ratio in ejection amount | — | 0.4 | 0.2 | 0.8 | — |
| Evaluation result | Ejection evaluation | Clogging evaluation (ejection reliability) | A | A | A | A | A |
| | Printing performance | Color development property (black density) | AA | A | AA | B | B |
| | | Rubbing fastness | B | AA | A | AA | A |
| | Physical property evaluation | Storage stability | A | A | A | A | A |

| | | Condition | Comparative example 1 | Comparative example 2 | Comparative example 3 | Comparative example 4 | Comparative example 5 |
|---|---|---|---|---|---|---|---|
| Solid content concentration of ink composition % | Pigment | Pigment dispersion liquid A, specific surface area 55 $m^2/g$ | — | 4.0 | 4.0 | 4.0 | 4.0 |
| | | Pigment dispersion liquid B, specific surface area 100 $m^2/g$ | — | — | — | — | — |
| | | Pigment dispersion liquid C, specific surface area 30 $m^2/g$ | 4.0 | — | — | — | — |
| | Fixing resin | Crosslinkable polycarbonate-based urethane resin | 6.0 | 6.0 | 6.0 | 6.0 | 6.0 |
| | | Non-crosslinkable polycarbonate-based urethane resin | — | — | — | — | — |
| | | Non-crosslinkable polyether-based urethane resin | — | — | — | — | — |
| | Organic solvent | Glycerin (SP value = 16.7) | 18 | 18 | — | 18 | 18 |
| | | Propylene glycol (SP value = 14.2) | 2 | — | — | 2 | 2 |
| | | 1,2 Hexanediol (SP value = 12.2) | — | 1 | 1 | — | 0.2 |
| | | 2-Pyrrolidone (SP value = 10.9) | — | 2 | 0.2 | — | — |
| | Metal alkali | NaOH | 0.15 | 0.15 | 0.15 | 0.05 | 1 |
| | | Composition ratio of self-dispersible pigment to metal alkali | 26.7 | 26.7 | 26.7 | 80.0 | 4.0 |
| | Others | BYK348 | 0.5 | 0.5 | 0.5 | 0.5 | 0.5 |
| | | Ion exchange water | Balance | Balance | Balance | Balance | Balance |
| Recording method | Treatment liquid | Same main scanning ejection | Yes | Yes | Yes | Yes | Yes |
| | | In-advance coating | — | — | — | — | — |
| | Bk ink | One-line ejection amount 25 $g/m^2$ | Yes | Yes | Yes | Yes | Yes |
| | | Two-line ejection amount 50 $g/m^2$ | — | — | — | — | — |
| | Coating liquid | Ejection amount 10 $g/m^2$ | — | — | — | — | — |
| | | Ejection amount 20 $g/m^2$ | — | — | — | — | — |
| | | Coating liquid/ink ratio in ejection amount | — | — | — | — | — |
| Evaluation result | Ejection evaluation | Clogging evaluation (ejection reliability) | A | C | C | C | C |
| | Printing performance | Color development property (black density) | C | A | A | A | A |
| | | Rubbing fastness | A | A | A | A | A |
| | Physical property evaluation | Storage stability | A | B | C | A | C |

Tables 1 and 2 will be further described.

[Ink Composition]

As the "crosslinkable polycarbonate-based urethane resin", Takelac WS5100 (manufactured by Mitsui Chemicals, Inc.) was used.

As the "non-crosslinkable polycarbonate-based urethane resin", Takelac W6110 (manufactured by Mitsui Chemicals, Inc.) was used.

As the "non-crosslinkable polycarbonate-based urethane resin", Takelac W5661 (manufactured by Mitsui Chemicals, Inc.) was used.

In addition, the "crosslinkable" resin indicates a reactive resin having a block isocyanate. In addition, the "polycarbonate-based" resin indicates a resin having a polycarbonate skeleton.

"BYK348" is a trade name manufactured by BYK Japan KK and is a silicone-based surfactant.

[Recording Method]

The "Bk ink" indicates the pigment printing ink jet ink composition.

The "same main scanning ejection" indicates that the ink adhesion step and the treatment liquid adhesion step are performed on the same scanning region of the cloth by the same main scanning.

As a method for the "in-advance coating", after the treatment liquid is padded in advance on a cotton broadcloth (cloth) by a padding method at a squeezing rate of 70%, drying is performed at 120° C. for 5 minutes, so that a pre-treated cloth is obtained.

The "one-line ejection" indicates that in an ink jet head used for the recording method, one nozzle line to eject the pigment printing ink jet ink composition is provided in the nozzle forming surface.

The "two-line ejection" indicates that in an ink jet head used for the recording method, two nozzle lines to eject the pigment printing ink jet ink composition are provided in the nozzle forming surface.

3.4. Method for Forming Printed Matter

By an ink jet method using an ink jet printer (product name "SC-F2000" manufactured by Seiko Epson Corporation), printing was performed under the conditions shown in Tables 1 to 2, so that an image was formed on a white cotton broadcloth (cloth). In the above image forming step, the image was formed in a manner such that the resolution was set to 1,440 dpi×720 dpi, the printing range was set to an A4 size, solid printing was performed using the pigment printing ink jet ink composition, and the coating amount thereof was set as shown in the above Tables 1 to 2. Subsequently, by using a high-temperature steamer ("HT-3-550 model" manufactured by Tsujii Dyeing Machine Manufacturing Co., Ltd.), drying was performed at 160° C. for 5 minutes, so that a printed matter in which the image was formed on the cloth was obtained. In addition, the solid printing indicates that liquid droplets (dots) of the ink are landed on all the pixels which are each a minimum recording unit region defined by the resolution.

3.5. Evaluation Method 3.5.1. Clogging Evaluation (Ejection Reliability)

The pigment printing ink jet ink composition according to each of Examples and Comparative Examples was filled in all lines of a print head of an ink jet printer ("SC-F2000" manufactured by Seiko Epson Corporation), and normal ejection of the ink composition from all the lines was confirmed. Subsequently, while the print head was shifted from a waiting position and was held in a printing region, the printer was left for 3 days in an environment at a temperature of 40° C. and a relative humidity of 20%. After being left, the print head was returned to the waiting position and then wiped by hand using a rubber wiper. The number of cleanings was counted until the ejection was recovered and then evaluated by the following criteria.

(Evaluation Criteria)

A: When cleaning is performed 3 times or less, all nozzles are recovered.

B: When cleaning is performed 4 to 10 times, all nozzles are recovered.

C: When cleaning is performed 11 times or more, nozzles are not all recovered.

3.5.2. Color Development Property (Black Density)

An OD value of the printed matter obtained in each Example was measured using a colorimeter Spectrolino manufactured by Gretag and was then evaluated by the following criteria.

(Evaluation Criteria)

AA: 1.6 or more

A: 1.5 to less than 1.6

B: 1.4 to less than 1.5

C: less than 1.4

3.5.3. RUBBING FASTNESS

In accordance with a method defined by ISO-105×12, a dyeing fastness test against rubbing was performed on the printed matter obtained in each Example using an I type (clock meter) tester. Dry rubbing was tested in accordance with a dry test defined by ISO-105×12 and was then evaluated using a contamination gray scale. The evaluation criteria are as shown below.

(Evaluation Criteria)

AA: Class 3-4 or higher

A: class 3 to less than class 3-4

B: class 2-3 to less than class 3

C: less than class 2-3

3.5.4. Storage Stability

After the pigment printing ink jet ink composition according to each of Examples and Comparative Examples was air-tightly received in a glass-made sample bottle having a volume of 50 cc, this glass-made bottle was placed in a constant-temperature bath at 50° C. and then left for 14 days in an environment at 50° C. After being left, the glass-made bottle was sufficiently recovered to room temperature, and the viscosity of the ink composition was then measured. The viscosity was measured in a manner such that using a viscoelastic tester MCR-300 (product name) manufactured by Pysica, after the temperature of the ink composition was controlled at 25° C., a viscosity at a shear rate of 200 was read. In addition, a viscosity change rate A after 14 days with respect to the initial viscosity was calculated. The evaluation criteria are as described below.

(Evaluation Criteria)

A: viscosity change rate A is ±5%.

B: viscosity change rate A is ±5% to less than ±10%.

C: viscosity change rate A is ±10% or more.

3.6. Evaluation Results

The evaluation results are shown in the above Tables 1 to 2.

From the evaluation results shown in the above Tables 1 to 2, it was found that in each example of the pigment printing ink jet ink composition which includes a self-dispersible black pigment having a specific surface area of 50 $m^2/g$ or more calculated from a measurement by a pulse NMR at 30° C., a metal alkali, a water-soluble organic solvent, and water, when the content of the self-dispersible black pigment with respect to the content of the metal alkali is 13 to 40 in terms of the composition ratio, the water-soluble organic solvent includes a compound having an SP value of 11 or more, and the water-soluble organic solvent includes no compound having an SP value of less than 11 at a content of more than 0.3 percent by mass with respect to the total mass of the ink composition, excellent color development property (black density) and ejection reliability can be obtained.

From the comparison between Example 1 and Comparative Example 1, it was found that when the specific surface area of the self-dispersible black pigment is not 50 $m^2/g$ or more, excellent color development property (black density) cannot be obtained.

From the comparison between Example 1 and Comparative Example 2, it was found that when the water-soluble organic solvent includes a compound having an SP value of less than 11 at a content of more than 0.3 percent by mass with respect to the total mass of the ink composition, excellent ejection reliability cannot be obtained.

From the comparison between Example 1 and Comparative Example 3, it was found that when the water-soluble organic solvent includes no compound having an SP value of 11 or more, excellent ejection reliability and storage stability cannot be obtained.

From the comparison between Example 1 and Comparative Examples 4 and 5, it was found that when the content of the self-dispersible black pigment with respect to the content of the metal alkali is not 13 to 40 in terms of the composition ratio, excellent ejection reliability and storage stability cannot be obtained.

From the results of Examples 1 to 3, it was found that when the content of the self-dispersible black pigment is in a specific range, the color development property (black density) and the rubbing fastness, and the ejection reliability and the storage stability are made more excellent.

From the results of Examples 1 and 4, it was found that when the specific surface area of the self-dispersible black pigment is 50 $m^2/g$ or more, an excellent color development property (black density) can be obtained.

From the results of Examples 1, 5, and 6, it was found that when the content of the fixing resin is in a specific range, the rubbing fastness, and the ejection reliability and the storage stability are made more excellent.

From the results of Examples 1, 9, and 10, it was found that when the SP value of the water-soluble organic solvent is higher, the ejection reliability tends to be improved.

From the results of Examples 1 and 11, it was found that when the ink composition is ejected from two nozzle lines, the color development property (black density) is made more excellent.

From the results of Examples 1 and 12 to 14, it was found that when the coating liquid is further adhered, the rubbing fastness is made more excellent.

From the results of Examples 1 and 15, it was found that when the treatment liquid is adhered by the same main scanning ejection, the color development property (black density) is made more excellent.

From the embodiments described above, the following conclusions are obtained.

A pigment printing ink jet ink composition includes: a self-dispersible black pigment having a specific surface area of 50 $m^2/g$ or more calculated from a measurement by a pulse NMR at 30° C.; a metal alkali; a water-soluble organic solvent; and water, and in the ink composition described above, a content of the self-dispersible black pigment with respect to a content of the metal alkali is 13 to 40 in terms of a composition ratio, the water-soluble organic solvent includes a compound having an SP value of 11 or more, and the water-soluble organic solvent includes no compound having an SP value of less than 11 at a content of more than 0.3 percent by mass with respect to a total mass of the ink composition.

In the pigment printing ink jet ink composition described above, the content of the self-dispersible black pigment with respect to the total mass of the ink composition may be 3 to 10 percent by mass.

Any one of the pigment printing ink jet ink compositions described above may further include a fixing resin, and the fixing resin may be an urethane resin having a polycarbonate skeleton.

In any one of the pigment printing ink jet ink compositions described above, the fixing resin may be a reactive urethane resin having a block isocyanate.

In any one of the pigment printing ink jet ink compositions described above, a content of the fixing resin with respect to the total mass of the ink composition may be 3 to 10 percent by mass.

An ink jet recording method includes: an ink adhesion step of ejecting any one of the pigment printing ink jet ink compositions described above from an ink jet head so as to be adhered to a cloth; and a treatment liquid adhesion step of ejecting a treatment liquid containing a cationic compound from the ink jet head so as to be adhered to the cloth, and the ink adhesion step and the treatment liquid adhesion step are performed on the same scanning region of the cloth by the same main scanning.

In the ink jet recording method described above, the ink jet head may have in a nozzle forming surface, a first nozzle line to eject the ink composition and a second nozzle line to eject the ink composition.

Any one of the ink jet recording methods described above may further include a coating liquid adhesion step of ejecting a coating liquid containing resin particles from the ink jet head so as to be adhered to the cloth, the coating liquid adhesion step may be performed simultaneously with or after the ink adhesion step, and when an ejection amount of the ink composition in the ink adhesion step is assumed to be 1, an ejection amount of the coating liquid in the coating liquid adhesion step may be 0.4 or less.

The present disclosure is not limited to the embodiments described above and may be variously changed and modified. For example, the present disclosure includes substantially the same structure as the structure described in the embodiment. That is, the substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

What is claimed is:

1. A pigment printing ink jet ink composition comprising:

a self-dispersible black pigment having a specific surface area of 80 $m^2/g$ or more calculated from a measurement by a pulse NMR at 30° C., a metal alkali;

a water-soluble organic solvent; and water, wherein a content of the self-dispersible black pigment with respect to a content of the metal alkali is 22 to 28 in terms of a composition ratio, the water-soluble organic solvent includes a compound having an SP value of 11 or more, and the water-soluble organic solvent includes no compound having an SP value of less than 11 at a content of more than 0.3 percent by mass with respect to a total mass of the ink composition.

2. The pigment printing ink jet ink composition according to claim 1, wherein the content of the self-dispersible black pigment with respect to the total mass of the ink composition is 3 to 10 percent by mass.

3. The pigment printing ink jet ink composition according to claim 1, further comprising a fixing resin, wherein the fixing resin is an urethane resin having a polycarbonate skeleton.

4. The pigment printing ink jet ink composition according to claim 3, wherein the fixing resin is a reactive urethane resin having a block isocyanate.

5. The pigment printing ink jet ink composition according to claim 3, wherein a content of the fixing resin with respect to the total mass of the ink composition is 3 to 10 percent by mass.

6. An ink jet recording method comprising:

an ink adhesion step of ejecting the pigment printing ink jet ink composition according to claim 1 from an ink jet head so as to be adhered to a cloth; and a treatment liquid adhesion step of ejecting a treatment liquid containing a cationic compound from the ink jet head so as to be adhered to the cloth, wherein the ink adhesion step and the treatment liquid adhesion step are performed on the same scanning region of the cloth by the same main scanning.

7. The ink jet recording method according to claim 6, wherein the ink jet head has in a nozzle forming surface, a first nozzle line to eject the ink composition and a second nozzle line to eject the ink composition.

8. The ink jet recording method according to claim 6, further comprising:

a coating liquid adhesion step of ejecting a coating liquid containing resin particles from the ink jet head so as to be adhered to the cloth, wherein the coating liquid adhesion step is performed simultaneously with or after the ink adhesion step, and when an ejection amount of the ink composition in the ink adhesion step is assumed to be 1, an ejection amount of the coating liquid in the coating liquid adhesion step is 0.4 or less.

* * * * *